United States Patent [19]

Grewar

[11] 4,325,221
[45] Apr. 20, 1982

[54] METHOD AND APPARATUS FOR REDUCING THE TEMPERATURE OF ARTICLES

[75] Inventor: Lloyd C. Grewar, Brassall, Australia

[73] Assignee: The Commonwealth Industrial Gases Limited, Surry Hills, Australia

[21] Appl. No.: 61,034

[22] Filed: Jul. 26, 1979

[30] Foreign Application Priority Data

Jul. 28, 1978 [AU] Australia ............................... PD5267

[51] Int. Cl.³ ............................................. F25D 13/06
[52] U.S. Cl. ........................................... 62/63; 62/64; 62/332; 62/374; 62/380
[58] Field of Search .................. 62/374, 375, 332, 380, 62/63, 64

[56] References Cited

U.S. PATENT DOCUMENTS

| | | | |
|---|---|---|---|
| 3,458,324 | 7/1969 | Kramer | 62/62 |
| 3,507,128 | 4/1970 | Murphy et al. | 62/332 |
| 3,805,538 | 4/1974 | Fritch, Jr. et al. | 62/63 |
| 4,028,774 | 6/1977 | Allan et al. | 17/24 |

Primary Examiner—Ronald C. Capossela
Attorney, Agent, or Firm—Fleit & Jacobson

[57] ABSTRACT

A method of freezing animal carcasses comprises spraying the carcass with liquid nitrogen to produce a chilled outer layer thereby to seal the moisture within the carcass for the dual purpose of maintaining the quality of the meat and preventing the frosting or icing up of the heat exchange coils of a forced draught cooling system utilized subsequently to bring the entirety of the carcass to a desired chilled or frozen condition. Also disclosed is a freezing room including means for liberating a cryogenic liquid into the air stream from the fans of a forced draught cooling system for rapid pull-down of the room temperature.

7 Claims, 3 Drawing Figures

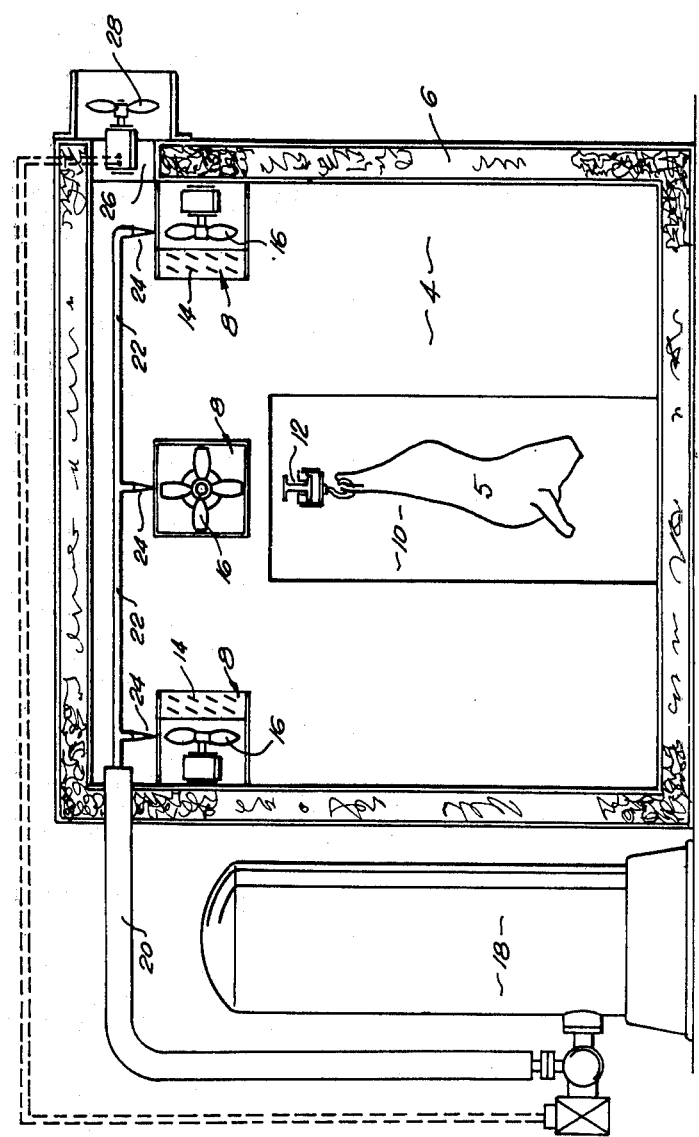

METHOD AND APPARATUS FOR REDUCING THE TEMPERATURE OF ARTICLES

FIELD OF THE INVENTION

The invention provides a method and apparatus for reducing the temperature of articles, more particularly foodstuffs containing moisture such as animal carcasses, for short or long term storage thereof.

SUMMARY OF THE PRIOR ART

A presently used method for cooling and freezing food articles of small size, for example less than 5 kg in weight, utilises a tunnel through which the articles are passed and in which they are immersed in a bath of cryogenic liquid or subjected to spray jets of a cryogenic liquid. The cryogenic liquid customarily used is liquid nitrogen or liquid carbon dioxide. Such arrangements however have not proven to be economically viable for large articles for example, sides of beef, which are considerably more than 5 kg in weight.

A further known method for cooling and freezing articles up to 5 kg weight comprises the step of immersing the articles in a bath of refrigerated water/glycol mixture to pre-chill them prior to placement in a cold room where they are subjected to a blast of cold air produced by fans blowing the air through a heat exchanger, usually the evaporator of a mechanical refrigeration plant, which absorbs heat from the air.

Alternatively articles of weight considerably greater than 5 kg may be placed in a cold room with forced draught cooling equipment so as to bring down the temperature of the articles over a relatively long term as the room temperature is pulled down. In such instances the air velocity within the room requires careful selection as the air is a fluid heat transfer medium and sufficient of it must be circulated to carry the heat from the product to be cooled to the heat exchanger.

In general, air velocities of from 2 to 10 meters per second are normal and, if the articles are unpackaged or not well packaged, significant moisture losses occur. This moisture is transported by the circulating air until it is deposited on the surfaces of the heat exchanger where it turns to ice and progressively impairs the efficiency of the exchanger and therefore of the refrigeration plant as a whole which as a consequence must be operated for periods of greater length than if icing up of the heat exchanger did not occur.

The invention relates particularly to the cooling, chilling and freezing of freshly slaughtered animals such as cattle, sheep, pigs or portions of the carcasses of same and poultry, such as turkeys, for eventual human consumption. Carcass chilling or freezing minimises meat spoilage by bacterial growth and is therefore a necessary step in processing the meat. It is desirable to extend the storage life of meat but the chilling methods previously used result in an undesirable loss of moisture in the meat tissue by evaporation.

Batch chilling is the method adopted in most abattoirs. Typically a cold room is filled with hot carcasses or sides of meat at approximately 37°–40° C. over a loading period of two to three hours while cold air is circulated around the room by forced draught cooling units. The air circulation is continued for the next twenty hours or so until the chilled carcasses are removed for further processing (at approximately 10° C.).

In a well run and well designed cold room approximately 2% of the initial carcass weight is lost due to evaporation of moisture from the carcass surfaces. This weight loss is considered to be excessive and of considerable economic importance to the meat industry.

Of even more economic significance is the fact that the moisture derived from the carcasses is deposited as ice or frost on the exposed surfaces of the heat exchangers of the mechanical refrigeration plants utilised to refrigerate the carcasses with consequent reduction in efficiency thereof. That reduction in efficiency not only increases the energy requirements to run the plant but also lengthens the duty cycle and so reduces the plant utilisation factor.

A prior attempt to overcome that difficulty is described in U.S. Pat. No. 4,028,774 where carcasses at body temperature for ultimate chill room hanging are pre-conditioned by exposure in a chilling tunnel to air at a temperature of from −30° F. to −10° F. for the purpose of producing a frozen crust on the carcass to prevent the subsequent release of moisture therefrom. That expedient is not altogether satisfactory because of the expensive nature of the large mechanically refrigerated chilling tunnel utilised and the fact that icing-up of the heat exchangers in that tunnel still occurs. Furthermore, there is still appreciable loss of carcass weight in the early stages of its progress through the tunnel.

SUMMARY OF THE INVENTION

An object of this invention is to provide a method and apparatus which prevents or at least greatly reduces moisture loss from food articles to be refrigerated said articles having a high moisture content, usually in excess of 50% by weight.

It is a further object of the invention to reduce the accumulation of frost or ice on the exposed surfaces of the heat absorbing heat exchangers of mechanical refrigeration plant's forced draught cooling units in cold rooms utilised to refrigerate such articles thereby improving their continuing efficiency.

The invention consists in a method of refrigerating a moist article comprising the steps of quick chilling a thin outer layer of the article to seal the moisture therein by contacting it with a cryogenic liquid and subsequently cooling the article throughout by placing it in a mechanically refrigerated cold room under conditions which ensure that the previously chilled outer layer does not thaw.

According to preferred embodiments, the cold room is furnished with forced draught cooling units and cryogenic liquid is liberated in the air stream emerging from the fans of those units for a relatively short period after the articles have been placed in the cold room to ensure that the surface layer on each article does not thaw as a result of heat flow from the interior of the article to the surface until the temperature in the cold room has been pulled down to a sufficiently low figure to obviate that possibility. Of course the release of cryogenic liquid in this way shortens the total time which the articles have to spend in the cold room to reach the desired fully frozen condition.

The term "cryogenic liquid" as used herein refers to a liquid having a boiling point at normal atmospheric pressures of less than −50° C. Liquid nitrogen and liquid carbon dioxide are typical examples thereof.

The term "cold room" as used herein refers to a refrigerated space in which articles may be placed for the reduction in temperature thereof and with which is associated an exteriorly adjacently located mechanical refrigeration plant supplying refrigerating medium to a heat exchanger of at least one forced draught cooling (FDC) unit within the cold room.

From the foregoing it will be seen that the present invention contemplates transporting freshly slaughtered carcasses, for example suspended from an overhead gantry, through a suitable space wherein the carcass will be subjected to direct contact with a cryogenic liquid and the cold gas evolved therefrom. The amount of cryogenic liquid directed at the carcass is sufficient temporarily to freeze and thus seal the surface membranes to prevent the egress of moisture from the carcass. The carcass is then transported directly into a cold room where it is subjected to refrigeration by the FDC unit or units therein until the deep butt temperature reaches approximately 10° C. At that time some or all of the carcasses may be removed from the cold room for butchering operations such as de-boning, quartering or the like.

If the carcasses removed for butchering are required to be frozen for storage they may be returned to the cold room or alternatively and more preferably to another cold room together with carcasses and other food articles to be frozen taken directly from the first mentioned cold room. That other cold room preferably is provided with a source of cryogenic liquid externally of the room and directed by a conduit to discharge by open ended pipeline or spray nozzle adjacent to the fans of the FDC units in the room. When the chilled articles to be frozen are installed in the cold room the fans of the FDC units are turned on and a supply of cryogenic liquid commenced so that the gas evolved by the evaporation of the liquid is circulated throughout the cold room and into contact with the carcasses. The supply of cryogenic liquid is terminated after approximately one hour when the mechanical refrigeration plant may be brought into action. The cold atmosphere will be circulated by the fans of the FDC units bringing the atmosphere into contact with the cooling coils of the units thereby further reducing the temperature of the room and contents within it. Under such circumstances and unlike the operation in conventional freezer rooms, no moisture is lost from the carcasses, etc. and therefore the atmosphere within the room remains dry with the heat exchanger coils or the like of the FDC units remaining ice-free so that they perform to their maximum designed capacity. As a consequence carcasses will become frozen and the temperature will equilibrate through the meat in approximately half the time previously required. Thus the carcasses not only retain their moisture content but the utilisation of the cold rooms is greatly improved by the reduction in time required to reach the required level of refrigeration of the article.

BRIEF DESCRIPTION OF THE DRAWINGS

FIG. 3 is a diagrammatic illustration of a cold room with a bulk cryogenic liquid supply facility also suitable for performing the method of the invention.

Referring now to FIGS. 1 and 2, following killing of the beast in a slaughter house the carcass is taken to a preparation room 3 for preparation prior to chilling. The carcass indicated at 5 is suspended from an overhead gantry 7 along which it is transferred to a pre-chilling station 9 which is a heat insulated room located preferably adjacent to the preparation room 3 and a chiller room 11.

Figure 1:
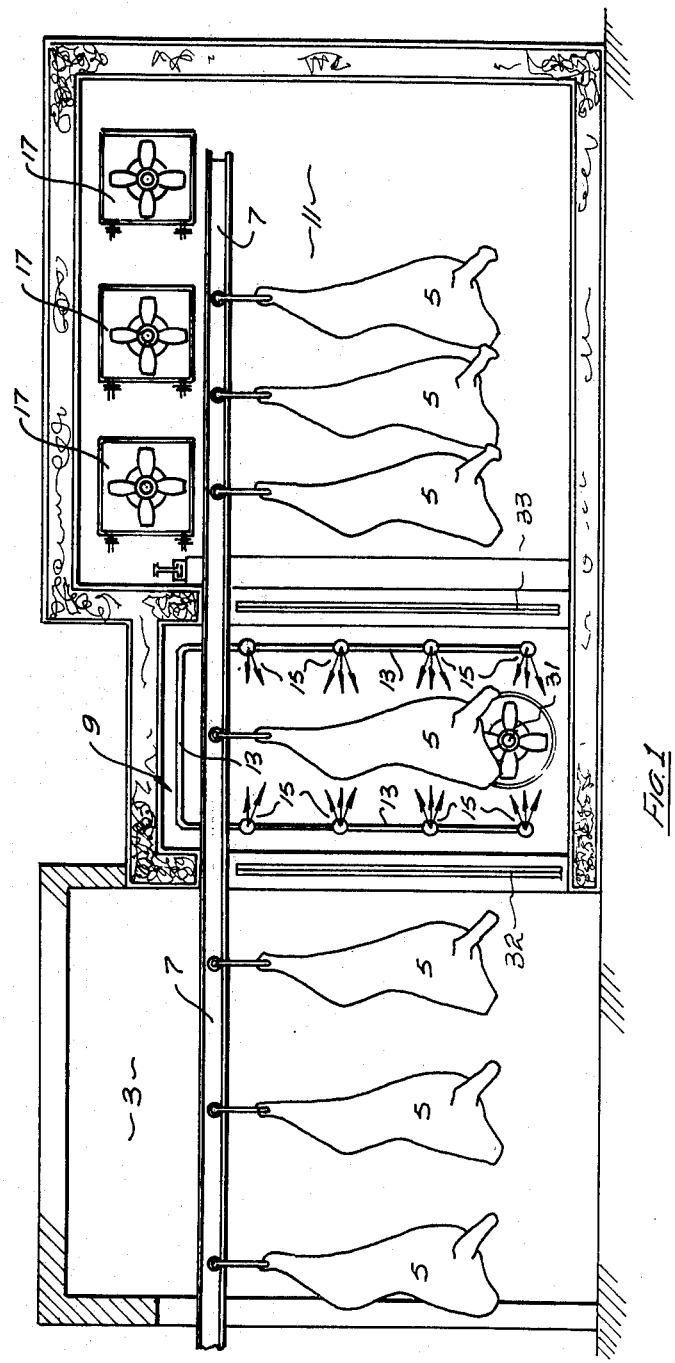
FIG. 1 is a diagrammatic view of a slaughter house preparation room, a pre-chiller and a chiller/freezer room for performing the method of the invention.

Overhead gantry 7 of the preparation room may consist of many similar rails throughout the preparation room which may interconnect as desired to enable versatility of gantry connecting with a similar gantry in the pre-chilling station 9 and with a similar series of gantry rails in chiller room 11. The gantry throughout the diagram for simplicity is shown as one rail numbered 7.

Located in pre-chiller station 9 is a means of supplying a cryogenic liquid to impinge upon the carcass 5 as it proceeds through the pre-chiller 9 thence to chiller room 11. The means by which the cryogenic liquid is supplied may be a conduit or a series of interconnected conduits 13 forming a spray header from which a number of sprays 15 of liquid may emanate to impinge on the carcass 5. Conduit 13 connects with a source 30 of cryogenic liquid. The supply of cryogenic liquid to spray header conduit 13 and sprays 15 will be dependent upon the size of the carcass and the frequency with which a carcass is supplied to the pre-chiller station. Suitable valves, temperature controllers, sequence timers and the like are provided in order to ensure adequate supply of cryogenic liquid to chill the skin of the carcass whilst being economical in the usage of the cryogenic liquid.

For preference the effect of the liquid spray is enhanced by providing a circulating fan 31 or fans in the pre-chiller station to provide a gas velocity therein of at least 2 meters per second.

Further, the gas produced by evaporation of the liquid which requires to be vented from the pre-chiller station may with advantage be fed to a cold room currently in use for refrigerating articles or storing previously refrigerated articles.

Following the pre-chill in station 9 the carcass is transported into chiller room 11 as for example along gantry 7 or otherwise as the installation requires.

In order to conserve the cold emitted by the cryogenic liquid supplied to pre-chiller station 9 the entrance to the pre-chiller from preparation room 3 preferably comprises curtains 32 which permit the transport therethrough of a carcass but return to the closed condition without assistance. Similar curtains 33 may be supplied prior to entry into the chiller room 11 of the diagram if the installation is an interconnected one as shown. As an alternative air curtains may be installed at the entrance and exit of the pre-chiller station.

Chiller room 11 may comprise an insulated walled room in which is installed a number of forced draught cooling units 17 connected to an externally located mechanical refrigeration plant (not shown). The room is fitted with an insulated door to isolate the interior of the room once it is filled with articles to be chilled. During the filling procedure the fans of the FDC units may be operated to ensure adequate circulation of atmosphere around the articles therein.

Although the preceding description refers to carcasses other large items may be passed through the pre-chiller station in baskets, trolleys or the like and stored in the chiller room for treatment.

When the chiller room is filled the door is securely closed and the mechanical refrigeration plant brought into action to bring the contents of the room to the desired temperature. When this situation is achieved those articles which are to be further prepared such as by butchering or de-boning are transported to a suitable treatment room. The chilled articles which are to be frozen together with the further prepared articles if they too are to be frozen are then transferred to a cold room operated as a freezer room.

Figure 2:
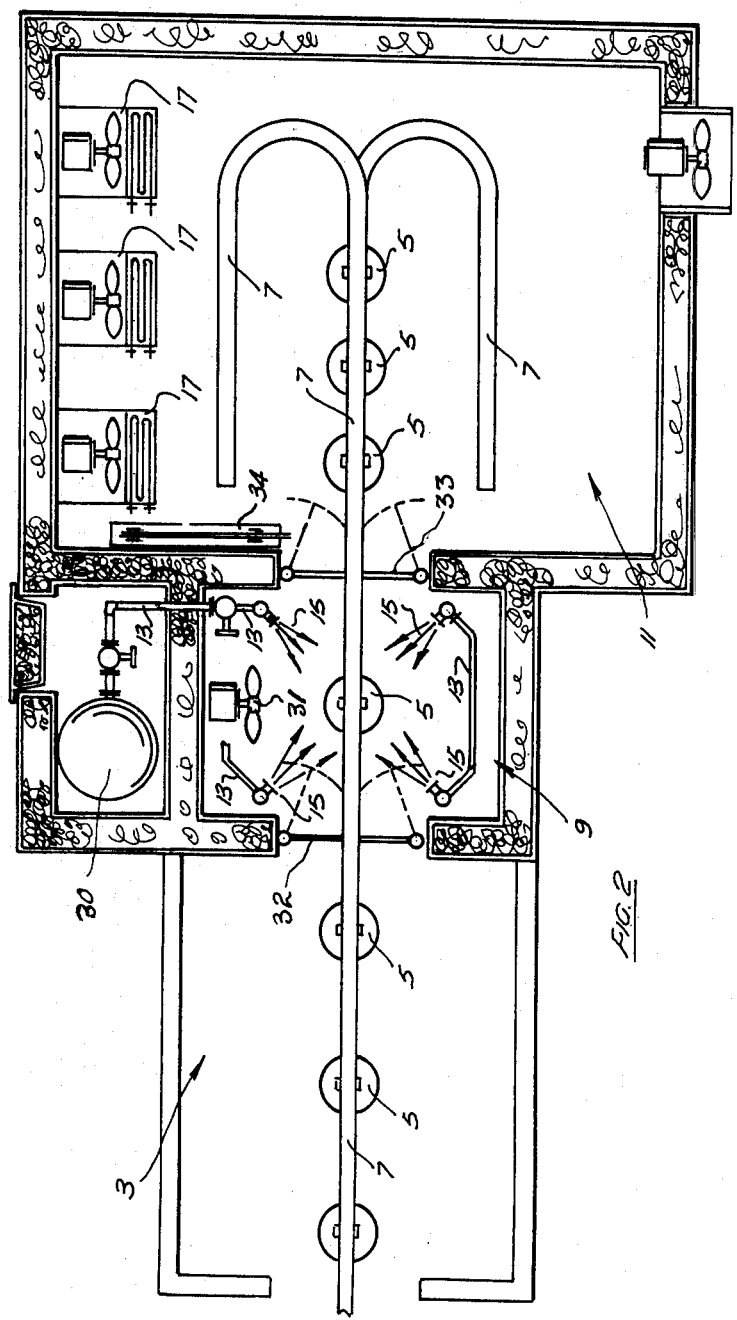
FIG. 2 is a diagrammatic plan view of the rooms of FIG. 1.

Conveniently the cold room 11 illustrated in FIGS. 1 and 2 may also provide the facilities of a freezer room, an example of which is shown in FIG. 3.

A freezer room is indicated in FIG. 3 by numeral 4. It has an insulated outer wall 6, FDC units 8 a door 10 and a gantry rail 12.

FDC units 8 are connected to a mechanical refrigeration plant (not shown) which supplies a refrigeration medium to the heat exchanger coils 14 of FDC units over and about which the atmosphere of the freezer room is circulated by fans 16 thereby to transfer the heat of the room atmosphere to the refrigeration plant.

To enable a cold room to be utilised as the freezer room of preferred embodiments of the present invention it is provided with an externally located source of cryogenic liquid 18 which by appropriate valving and insulated pipeline 20 cryogenic liquid is supplied to a conduit 22 which terminates in open ended pipeline or has spray nozzles 24 to direct the cryogenic liquid and the gas evolved therefrom at the fans 16 of the FDC units 8.

To compensate for the increased volume of atmosphere within the freezer room due to the gas evolved from the cryogenic liquid, room 4 is fitted with an exhaust port 26 and an extractor fan 28 which will be brought into operation during the period of supply of cryogenic liquid to conduit 22.

What is claimed is:

1. A method of refrigerating a freshly slaughtered suspended carcass having body weight in excess of 5 kg. comprising the steps of supplying cryogenic liquid to a pre-chilling station containing the suspended carcass after introduction of the carcass into the pre-chilling station, the supply being in timed sequence with the introduction of the carcass; quick chilling a thin outer layer of the entire carcass to seal the moisture therein by contacting all of the outer surface of the carcass with controlled usage of the supplied cryogenic liquid, and subsequently cooling the carcass throughout by placing it in a mechanically refrigerated cold room under conditions that ensure that the previously chilled outer layer does not thaw.

2. A method according to claim 1 wherein said cold room comprises a forced draught cooling unit and wherein said conditions ensuring the previously chilled outer layer does not thaw are obtained, initially at least, by liberating cryogenic liquid into the airstream from the fan of said unit.

3. A method according to claim 2, further including the step of removing from said cold room the gas evolved from the cryogenic liquid.

4. A method according to claim 1 or claim 2, including the step of removing the carcass from the cold room after chilling for a conventional processing operation and then returning it to the cold room for the completion of the refrigeration at a temperature such that the evaporation of moisture therefrom is inhibited even though said outer layer may have partially thawed during said processing operation.

5. A method of refrigerating a freshly slaughtered carcass comprising:
   preparing the carcass for chilling;
   suspending the prepared carcass from conveying means so that substantially all the exterior surface of the carcass is exposed;
   conveying the suspended carcass into a pre-chilling station;
   supplying cryogenic liquid to said pre-chilling station after introduction of the suspended carcass, the supply being in timed sequence with the introduction of the carcass so as to ensure chilling of an exterior surface of the carcass with controlled usage of cryogenic liquid;
   impinging the supplied cryogenic liquid against substantially all the exterior surface of the carcass so that the liquid contacts the exterior surface to produce a chilled outer layer thereby sealing moisture within the carcass;
   conveying the suspended carcass to a chiller room; and
   chilling the entire carcass to a desired temperature.

6. A method according to claim 5, wherein chilling the entire carcass includes furnishing cryogenic liquid to cooling air being fed the chiller room to ensure that the chilled outer layer does not thaw as a result of heat flow from the interior of the carcass.

7. An apparatus for refrigerating a freshly slaughtered carcass comprising:
   a preparation station for receiving a carcass to be chilled and in which the carcass is prepared for chilling;
   a pre-chilling station for freezing an outer layer of the carcass to thereby seal moisture within the carcass;
   a plurality of sprays arranged in spaced apart horizontally-extending arrays positioned on both sides of a conveying path of carcasses into the pre-chilling station so as to impinge a controlled amount of cryogenic liquid against substantially all of the exterior surface of the carcass to produce the frozen outer layer;
   a chiller room for chilling the entire carcass to a desired temperature; and
   conveying means for sequentially conveying the carcass between the preparation station, the pre-chilling station, and the chiller room, the conveying means including means for suspending the prepared carcass so that substantially all the exterior surface thereof is exposed.

* * * * *